C. P. BOOMER.
SPRING RUNNING GEAR FOR AUTOMOBILES.
APPLICATION FILED JAN. 2, 1909.
943,764.
Patented Dec. 21, 1909.
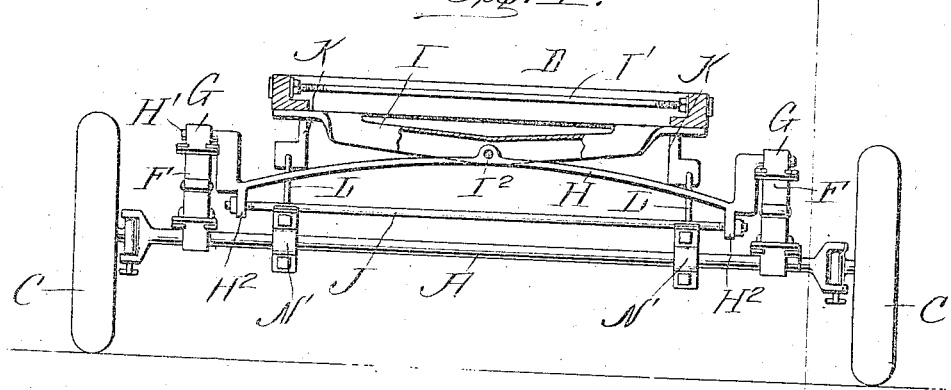
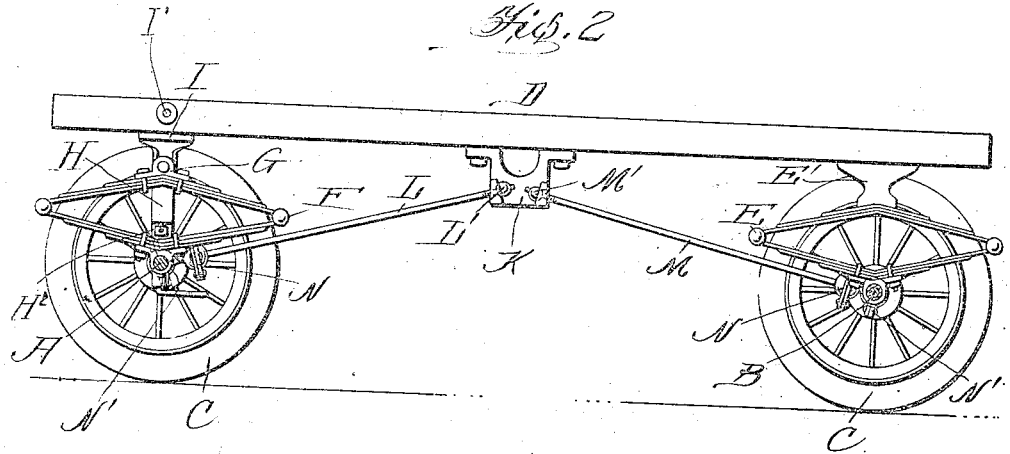
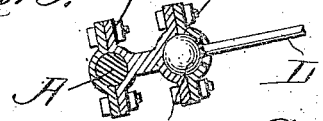
Witnesses
Inventor
Clarence P. Boomer,

UNITED STATES PATENT OFFICE.

CLARENCE P. BOOMER, OF MUNCIE, INDIANA.

SPRING RUNNING-GEAR FOR AUTOMOBILES.

943,764.

Specification of Letters Patent. Patented Dec. 21, 1909.

Application filed January 2, 1909. Serial No. 470,455.

*To all whom it may concern:*

Be it known that I, CLARENCE P. BOOMER, a citizen of the United States, residing at Muncie, in the county of Delaware and State of Indiana, have invented a new and useful Improvement in Spring Running-Gear for Automobiles, of which the following is a specification.

This invention relates to a spring running gear for automobiles, the object being to provide a running gear which is so constructed that the frame will be prevented from being twisted when traveling over rough roads.

Another object of my invention is to provide a running gear which is exceedingly cheap and simple in construction and one which is formed of a very few parts which are so connected that they are not likely to get out of order.

A further object of my invention is to provide a running gear which can be readily used on any of the ordinary makes of automobiles now in use.

Figure 1 is a front elevation of my improved running gear showing the application of the same. Fig. 2 is a section taken on the line 2—2 of Fig. 1. Fig. 3 is a detail section showing the manner of connecting the truss rod to the axle.

In the drawings A indicates the front axle, B the rear axle which are provided with the ordinary wheels C and D the frame upon which the body rests. The rear axle B has secured thereon adjacent each end, double bowed springs E on which is secured a bolster E' upon which the rear end of the frame D rests. Secured on the front axle A are double bowed springs F, on which are fixed bearing plates G in which are pivotally mounted the rounded angle ends H' of an arched bar H, over which is pivotally mounted a reversed grooved arched bar I on a bolt I² extending transversely through said bars, said arched bar being provided with flattened ends which are secured to the undersides of the frame D.

The side bars of the frame D over the arched bar I, are connected together by a truss bar I', so as to prevent the frame from spreading and the arched bar H is provided with apertured lugs H², through which extends a rod J having threaded ends on which are mounted nuts for preventing the bar from spreading, and it will be seen by this arrangement that the two arched bars will be held in a rigid position. It will be seen that by this arrangement, the ends of the bar H have a certain amount of movement in the bearings G whereby when traveling over very rough roads either wheel can be lifted without any danger of twisting the frame.

Secured centrally to the underside of the frame D adjacent each side edge, is a bracket K provided with sockets in which are mounted balls L', M', of truss rods L and M, which are provided with balls L² at their other ends mounted in sockets N carried by clips N' adapted to be fastened over the front and rear axles so as to hold the frame in the proper position and to relieve the driving strain.

From the foregoing description, it will be seen that I have provided a running gear which is so constructed that one front wheel and one rear wheel upon opposite sides may be raised as when traveling over rough roads without twisting the frame in any manner, thereby overcoming difficulties now existing with gears of this character in use.

What I claim is:—

1. The combination with a pair of axles provided with double bowed springs, of a bolster mounted on the springs of one of the axles, an arched bar pivotally mounted on the springs of the other axle, an arched bar pivotally connected to said arched bar, and a frame mounted on the last mentioned arched bar and the bolster.

2. The combination with a front and rear axle, of double bowed springs secured on said axles, a bolster mounted on the springs of the rear axle, bearing plates secured on the springs of the front axle, an arched bar provided with angled ends mounted in said bearing plates, an arched bar carried by said bar, a frame mounted on the last mentioned arched bar and bolster and truss rods connecting said axles to said frame.

3. The combination with a pair of axles, provided with double-bowed springs, of bearing plates secured on the springs of one of said axles, a bolster secured on the springs of the other axle, an arched bar having angled ends mounted in the bearing plates of the springs of one of the axles, a rod connecting the ends of said arched bar, a reversed arched bar pivotally mounted on the first mentioned bar, a frame mounted on the bolster and last mentioned bar, brackets carried by said frame, and truss rods connecting said brackets with the respective axles, for the purpose described.

CLARENCE P. BOOMER.

Witnesses:
 WILL P. KOONS,
 G. E. KOONS.